(12) United States Patent
Weilandt et al.

(10) Patent No.: US 6,538,050 B1
(45) Date of Patent: Mar. 25, 2003

(54) METHOD OF FOAMING A POLYMER COMPOSITION USING ZEOLITE AND FOAMED ARTICLES SO MADE

(75) Inventors: Karl-Dieter Weilandt, Minneapolis, MN (US); Erik Peters, Garching (DE)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/004,202

(22) Filed: Nov. 1, 2001

(51) Int. Cl.[7] .................................................. C08J 9/32
(52) U.S. Cl. ........................ 523/219; 521/91; 521/145; 523/218
(58) Field of Search ................................ 523/218, 219; 521/91, 145

(56) References Cited

U.S. PATENT DOCUMENTS

| | | | |
|---|---|---|---|
| 3,072,583 A | 1/1963 | Randa ........................ 260/2.5 |
| 4,425,448 A | * 1/1984 | Concannon et al. | |
| 4,478,965 A | * 10/1984 | Concannon et al. | |
| 4,764,538 A | 8/1988 | Buckmaster et al. .......... 521/85 |
| 4,877,815 A | 10/1989 | Buckmaster et al. .......... 521/85 |
| 4,916,173 A | * 4/1990 | Otloski | |
| 5,717,001 A | 2/1998 | Books et al. | |
| 5,726,214 A | 3/1998 | Buckmaster et al. ........ 521/145 |
| 5,753,747 A | * 5/1998 | Olien | |
| 5,847,017 A | * 12/1998 | Brandt | |

FOREIGN PATENT DOCUMENTS

| | | | |
|---|---|---|---|
| DE | 196 10 330 A1 | 9/1997 | |
| JP | 08-12796 | 1/1996 | .............. C08J/9/12 |

OTHER PUBLICATIONS

*Journal of Applied Physics*, vol. 89, No. 8, 2001, pp. 4503–4511.

* cited by examiner

*Primary Examiner*—Morton Foelak
(74) *Attorney, Agent, or Firm*—Brian E. Szymanski; James V. Lilly

(57) ABSTRACT

The present invention relates to a method of foaming a polymer comprising the steps of providing a composition comprising said polymer and a zeolite in an amount of 0.3% or more based on the weight of said polymer and extruding said composition. The invention further relates to foamed articles and to the use of zeolites as foaming agents in the foaming of polymers.

20 Claims, 1 Drawing Sheet

Figure 1:
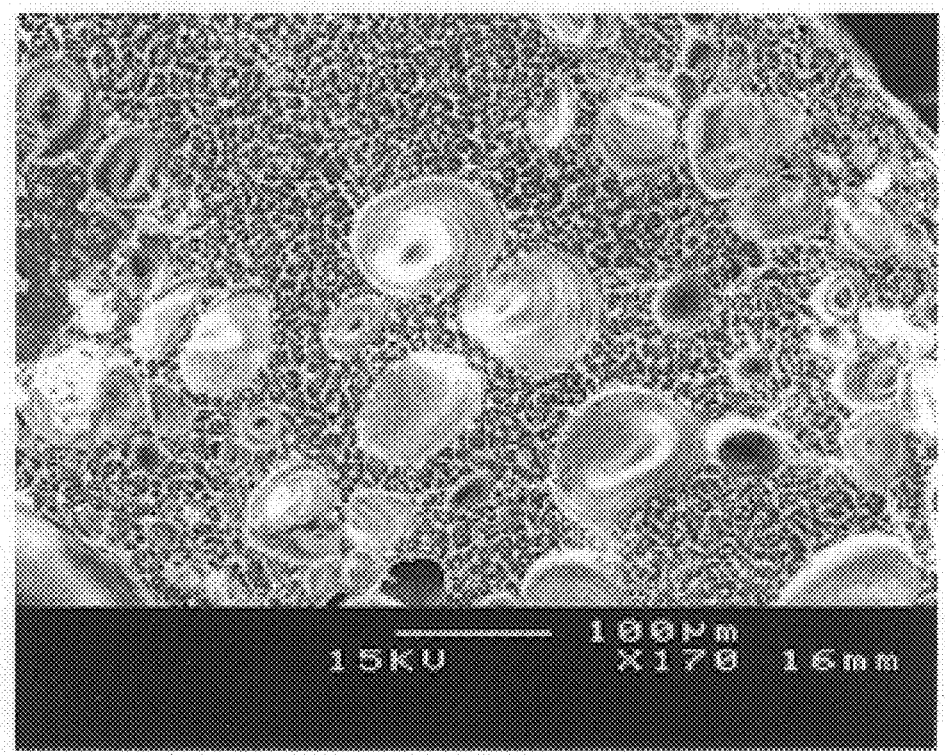

METHOD OF FOAMING A POLYMER COMPOSITION USING ZEOLITE AND FOAMED ARTICLES SO MADE

FIELD

The present invention relates to a method of foaming a polymer, in particular a fluoropolymer so as to produce a foamed article. In particular, the present invention relates to the use of zeolites as foaming agent to produce a polymer foam.

BACKGROUND

Foamed articles and in particular foamed polymer articles are well known in the art and have many applications. Foams are used for example for cushioning, insulation (thermal as well as sound), protection (packaging), weight reduction, impact absorption and thermal, chemical and electrical inertness. Such applications include for example wire insulation, coatings, tubes, films etc. Foamed polymer articles are typically produced from thermosetting foams, thermoplastic foams or elastomeric foams. Thermoplastic polymer foams can be made using expanded beads or conventional polymer processing techniques like extrusion, injection molding, reactive injection and mechanical blending. Foam extrusion, typically involves melting of the polymer in an extruder, adding a gas (or a compound that is in a gaseous state at extrusion temperature and standard pressure) (blowing agent) or a source of a gas, e.g. a chemical compound that produces a gas upon decomposition, and then extruding the molten thermoplastic polymer through a die to form a foamed structure. The process wherein a gas is used to foam the thermoplastic polymer is called physical foaming whereas the process wherein there is used a chemical compound which decomposes to produce the blowing agent is called chemical foam blowing. Often nucleating agents are also added to the molten polymer so as to improve the pore size and the homogeneity of the resulting foam.

Many different thermoplastic polymers are known to produce foamed polymer articles and these include for example polypropylene, polyethylene and polyester. Foamed polymer articles produced from thermoplastic melt processible fluoropolymers, i.e. polymers that have a partially or fully fluorinated backbone, are known as well. Such foamed fluoropolymers are of interest because of the superior heat resistance, chemical inertness, incombustibility, good dielectric properties, in particular insulating properties. For example, a foamed copolymer of tetrafluoroethylene and hexafluoropropylene, known as FEP, is particularly suitable for insulation of electrical wires such as data communication cables and coaxial cables because of the low dielectric constant and low dissipation factor associated with such foamed FEP polymers.

Processes for producing foamed polymer articles, including foamed fluoropolymers, have been disclosed in e.g. U.S. Pat. No. 5,726,214, U.S. Pat. No. 4,877,815 and U.S. Pat. No. 3,072,583. Additionally, U.S. Pat. No. 3,072,583 discloses the foaming of polyolefins using blowing agent and boron nitride as a nucleating agent. U.S. Pat. No. 4,764,538 discloses the use of boron nitride and certain inorganic salts as nucleating agents. U.S. Pat. No. 5,726,214 discloses the use of certain sulfonic and phosphonic acids as nucleating agents to foam a thermoplastic polymer through a physical or chemical foaming process. JP 08-12796 discloses the use of a combination of boron nitride and a zeolite as a nucleating agent in a composition to foam fluoropolymer resins.

A disadvantage of the processes of the prior art is that special equipment is needed to inject the gas when physical foaming is employed. When chemical foaming is used, the chemical foaming agent used may cause colored decomposition compounds to be formed and/or reaction with the polymer to be foamed may occur. Also, in order to produce foams of small cell size and of high homogeneity, nucleating agents need to be added to the composition, which may make the manufacturing more costly and less convenient.

It would be desirable to find an alternative way of foaming a thermoplastic polymer composition, which removes or mitigates one or more of the disadvantages of the prior art foaming processes. In particular, it would be desirable to find a method of foaming that can be easily practiced without the need for special equipment. Desirably, the new foaming process is easy and convenient and can be practiced in a cost effective and reliable way. Furthermore, it would be desirable to find foamed fluoropolymer articles that can be produced in an easy, convenient and cost effective way and that have good and/or improved properties, in particular that have improved dielectric properties.

SUMMARY

In accordance with the present invention there is provided a method of foaming a polymer comprising the steps of providing a composition comprising said polymer and a zeolite in an amount of 0.3% or more based on the weight of said polymer and extruding said composition.

Additionally, there is provided a foamed article comprising a foamed polymer comprising a zeolite in amount of at least 0.3% by weight based on the weight of polymer.

Finally, there is provided the use of a zeolite to foam a polymer, in particular a fluoropolymer.

It has been found that zeolites can be used on their own without the addition of a gas or a chemical foaming agent (i.e., a material that generates gas) to foam a thermoplastic melt processible polymer. This is surprising as the zeolites are not per se capable of decomposing into a gas and they are obviously not gas substances themselves. An interesting aspect of the use of a zeolite as the foaming agent is that it can simply be dry blended with the polymer or blended directly into the melt and upon extrusion of the zeolite containing polymer composition they will foam the polymer to a degree depending on the amount of zeolite contained. Of course the zeolite can be used in combination with typical foaming agents such as a gas or a chemical foaming agent but this is not necessary. Accordingly, the foaming of the polymer can be carried out on conventional extrusion equipment. Also, a foamed polymer produced with the process of the invention can be reintroduced into the extrusion equipment and will foam again without adding new or additional zeolite. Such is normally not possible with the known chemical foaming agent because in the known processes the chemical foaming agent will have been consumed in the foaming process. This provides an additional advantage for the process of the present invention because any waste of the foamed article can be conveniently recycled and used again to produce foamed articles. The zeolite is furthermore a substantially inert inorganic compound that can be used at high temperature without the risk of decomposing.

It has further been found that the foamed articles produced with the method of the invention may have very fine cells of high homogeneity. In particular, foams produced with the invention typically show closed cells distributed in a network of open cells. As a result, foams can be produced that have highly desirable properties. For example, foamed fluoropolymers produced with the method of the invention have excellent dielectric properties, in particular a low dielectric constant and a low loss factor or dissipation factor making such foamed fluoropolymers particularly suitable as insulating medium in for example wires, for example data communication cables such as plenum wires and high frequency cables such as coaxial cables.

Additionally, the foamed articles may find application as piezoelectric substrates or in tubes.

DETAILED DESCRIPTION

Zeolites used as foaming agent in the present invention are reversibly hydrated aluminum silicates that generally contain alkali or alkaline earth metal oxides which may be ion exchanged for other metals or for hydrogen. Zeolites for use in this invention may be synthetic zeolites as well as naturally occurring zeolites. The zeolite may be represented by the general structural definition:

$$M_{x/n}[(AlO_2)_x(SiO_2)_y]\cdot mH_2O$$

wherein M represents a cation such as $H^+$, $NH_4^+$, sodium, potassium, magnesium, and calcium of valence n, n is 1 or 2. x and y can vary from 1 to a large number, e.g. 5000 but usually has a value of 1 to 150. m represents the moles of water contained in the zeolitic voids. The zeolite framework is typically made up of $SiO_4$ tetrahedra linked together by sharing of oxygen ions. Substitution of Al for Si generates a charge imbalance, necessitating the inclusion of a cation. The structures typically contain channels or interconnected voids that are occupied by the cations and water molecules. The water may be removed reversibly, generally by the application of heat, which leaves intact the crystalline host structure permeated with micropores that may account for >50% of the microcrystal's volume. Preferably, the water content of the zeolite for use in the invention is not more than 10% by weight, preferably not more than 5% by weight. Most preferably the water content of the zeolites is less than 2% by weight. A typical water content of the zeolites is from 0.5 to 1.5% by weight. Particularly when a fluoropolymer is used as the polymer that is being foamed, it may be desirable to use a zeolite of low water content so as to avoid browning of the composition to occur.

There are two types of structures known for zeolites: one provides an internal pore system comprising interconnected cage-like voids; the second provides a pore system of uniform channels which, in some instances, are one-dimensional and in others intersect with similar channels to produce two- or three-dimensional channel systems. Either of these can be used with the present invention. The pore size of the zeolite may range from 0.3 to 2 nm and the zeolites will typically have an average size of 15 µm or less, preferably 10 µm or less.

Naturally occurring zeolites that can be used include chabazite, erionite, mordenite, and clinoptilolite. Synthetic zeolites for use in this invention include zeolite A, zeolite X, zeolite Y, zeolite L, zeolite omega, zeolite ZSM-5 and zeolite beta. The zeolite may be hydrophobised such as for example in the zeolite commercially available from Degussa-Huels under the tradename Flavith D. Hydrophobization is typically achieved by lowering the amount of aluminum relative to silicium in the zeolite. Typically, the silicium to aluminum ratio, expressed as the molar ratio of $SiO_2$ to $Al_2O_3$ and known as SAR, is at least 25, preferably at least 50 and more preferably at least 100. The SAR may even be as large as 1000 or more. Mixtures of two or more zeolites may be used in the invention as well.

The amount of zeolite that should be used to foam a polymer in connection with the method of the present invention depends on the degree of foaming that is desired. Typically, at least 0.3% by weight based on the weight of polymer of the zeolite should be used, preferably at least 0.5% by weight and more preferably at least 1% by weight. The maximum amount of zeolite to be included is not critical and is subject to economic considerations as well as considerations as to the properties of the foamed polymer article. Typically, the maximum amount of zeolite that is included with the polymer is not more than 10% by weight. A particularly preferred range of the amount of zeolite is between 2% by weight and 7% by weight of the polymer.

Although the zeolite on its own is suitable for foaming a polymer, the present invention does not exclude the option of combining the zeolite as a foaming agent with other foaming agents, such as for example a physical foaming agent such as nitrogen gas or a chemical foaming agent. Although in such an embodiment the convenience of manufacturing may be minimized, the zeolite still provides the advantage of producing a foamed article with particularly good properties such as for example dielectric properties, which may otherwise not be obtained. Also, it has been observed that the addition of zeolite to the polymer composition to be foamed may allow the extrusion and foaming of the polymer to be run at a higher speed thereby reducing the manufacturing cost. For example the extrusion and foaming of a fluoropolymer in the presence of zeolite Y has shown an increase in the speed at which the fluoropolymer can be extruded.

The polymers that can be used in connection with the present invention include polymers that are thermoplastic and are often melt processable. By the term thermoplastic is meant that the polymers can be melted upon heating and solidify again upon cooling. By melt processable is meant that the melted polymer should have a melt viscosity low enough such that it can be processed through a melt extrusion equipment. Suitable polymers for use in the invention include polyolefin polymers such as polyethylene and polypropylene as well as other thermoplastic polymers such as polyesters. Particularly preferred polymers for use with the present invention are fluoropolymers. By the term fluoropolymer is meant a polymer that has a partially or fully fluorinated backbone. Particularly preferred fluoropolymers are those that have a backbone that is at least 30% by weight fluorinated, preferably at least 50% by weight fluorinated, more preferably at least 70% by weight fluorinated and most preferably polymers that have a fully fluorinated backbone. Polymers that have a fully fluorinated backbone are sometimes known as perfluorinated polymers.

Examples of fluoropolymers for use in this invention include polymers of one or more fluorinated monomers optionally in combination with one or more non-fluorinated monomers. Examples of fluorinated monomers include fluorinated olefins such as tetrafluoroethylene, chlorotrifluoroethylene, vinyl fluoride, vinylidene fluoride and fluorinated alkyl vinyl monomers such as hexafluoropropylene; fluorinated vinyl ethers, including perfluorinated vinyl ethers and fluorinated allyl ethers including perfluorinated allyl ethers. Suitable non-fluorinated comonomers include vinyl chloride, vinylidene chloride and $C_2$–$C_8$ olefins such as ethylene and propylene.

Examples of perfluorovinyl ethers that can be used in the process of the invention include those that correspond to the formula:

$$CF_2=CF-O-R_f$$

wherein $R_f$ represents a perfluorinated aliphatic group that may contain one or more oxygen atoms.

Particularly preferred perfluorinated vinyl ethers correspond to the formula:

$$CF_2=CFO(R^a_fO)_n (R^b_fO)_m R^C_f$$

wherein $R^a_f$ and $R^b_f$ are different linear or branched perfluoroalkylene groups of 1–6 carbon atoms, in particular 2 to 6 carbon atoms, m and n are independently 0–10 and $R^C_f$ is a perfluoroalkyl group of 1–6 carbon atoms. Specific examples of perfluorinated vinyl ethers include perfluoro (methyl vinyl) ether (PMVE), perfluoro (ethyl vinyl) ether (PEVE), perfluoro (n-propyl vinyl) ether (PPVE-1), perfluoro-2-propoxypropylvinyl ether (PPVE-2), perfluoro-3-methoxy-n-propylvinyl ether, perfluoro-2-methoxy-ethylvinyl ether and $CF_3-(CF_2)_2-O-CF(CF_3)-CF_2-O-CF(CF_3)-CF_2-O-CF=CF_2$.

Suitable perfluoroalkyl vinyl monomers correspond to the general formula:

$$CF_2=CF-R^d_f \text{ or } CH_2=CH-R^d_f$$

wherein $R^d_f$ represents a perfluoroalkyl group of 1 to 10, preferably 1 to 5 carbon atoms. A typical example of a perfluoroalkyl vinyl monomer is hexafluoropropylene.

Particular examples of fluoropolymers for use with the present invention include homopolymers of tetrafluoroethylene, copolymers of tetrafluoroethylene or chlorotrifluoroethylene and ethylene, copolymers of tetrafluoroethylene and hexafluoropropylene, copolymers of tetrafluoroethylene, vinylidene fluoride and hexafluoropropylene, copolymers of tetrafluoroethylene or chlorotrifluoroethylene, ethylene and a perfluorovinyl ether and copolymers of tetrafluoroethylene and a perfluorovinyl ether.

Typically, the thermoplastic melt processible fluoropolymers for use in this invention will have a melting point of 50° C. to 310° C., preferably the melting point is at least 100° C., more preferably at least 160° C. Typically, the melt processable fluoropolymer will have a melt temperature of at least 245° C. such a for example in case of an FEP product. If the melt processable fluoropolymer is of the PFA type, i.e. a perfluoroalkoxy copolymer, the melt temperature will typically be at least 270° C., preferably at least 285° C.

The composition for foaming may comprise still further additives such as nucleating agents. Nucleating agents are typically compounds that help control the cell size of the foam and generally result in a more homogeneous cell size. A commonly employed nucleating agent is boron nitride or a combination thereof with certain inorganic salts as disclosed in U.S. Pat. No. 4,764,538. Other nucleating agents that can be used include the sulphonic or phosphonic acid acids and salts thereof disclosed in U.S. Pat. No. 4,877,815. However, even without the use of a nucleating agent, the foams produced in connection with the invention are highly homogeneous.

A polymer can be foamed in connection with the method of the invention by adding thereto a zeolite and extruding the polymer in extrusion equipment or otherwise thermally processing it to form a desired shape. The zeolite may be blended with the solid polymer, for example by mixing it with the polymer granulates or powder. The zeolite should be mixed with the polymer for a time sufficient to provide a product capable of foaming in a relatively uniform manner. This mixture can then be further processed, e.g., by extrusion, to heat it to a desired temperature so as to obtain a molten polymer having blended therein the zeolite. As this molten composition leaves the processing equipment, e.g., the extrusion die, the composition foams and this foam is thereafter cooled thereby forming the final foamed product. Instead of adding the zeolite to the solid polymer, it may also be added into the already melted polymer. Additionally, if desired, a physical foaming agent such as a gas, e.g. nitrogen gas, may be introduced and dissolved in the melted polymer. Such physical foaming agent will expand when the melted polymer leaves the extrusion die, thereby causing additional foaming of the polymer. However, in order to dissolve such a physical foaming agent in the polymer melt in the extruder will require special equipment for handling and introducing the foaming agent in the melt.

The foamed polymer articles produced with the method of the invention preferably will have an average cell size for the closed cells of not more than 100$\mu$m, preferably not more than 50$\mu$m. Such foamed polymer articles can be readily produced with the present invention by selecting a particular zeolite and amounts thereof. The foaming degree of the foamed polymer will typically be between 5% and 70%, preferably between 20% and 50%. The desired foaming degree can be conveniently obtained by selecting the appropriate amount of zeolite and/or combining the zeolite with a chemical or physical foaming agent such as for example nitrogen gas.

The foamed polymer article that can be obtained with this invention can be used in any of the applications in which foamed articles are used. For example, the foamed article may be a film, a tube or a hose. Also, foamed polymers such as for example foamed polyolefin polymers can be formed into piezoelectric substrates as described in for example Journal of Applied Physics, Volume 89, number 8, 2001, pages 4503 to 4511. Additionally, the foamed polymers, in particular the foamed fluoropolymers produced with this invention find desirable application as electrical insulation media in particular for the insulation of electrical cables. Such electrical cables include data communication cables that operate at high frequency of for example 100 kHz to 40 GigaHz. The cables may be for example coax cables or so called twisted pair cables.

The invention is further illustrated by the following examples in which all parts and percentage are by weight unless otherwise indicated. These examples merely illustrate the merits of the invention and they should not be taken to limit the invention in any way.

EXAMPLES

Example 1

Composition A.

Composition A was prepared by mechanically pre-blending and than melt blending the constituents of the composition on a single screw extruder with a die-face cutting device. Composition A contained:

97.5% by weight of FEP (copolymer of TFE and HFP) having an MFI of 21g/10 min (measured according ASTM D1238) and a melting point of 253° C. measured via DSC.

2.5% by weight of Zeolite Flavith™ D 206 from Degussa, this is a Y Zeolite with a moisture content of 0.6% by weight measured via thermal gravimetric analyses with a heating ramp of 10° C./min up to 460° C. measured in air.

This composition was extruded via a single screw extruder Type Siebe HSP2827, which is a 28 mm single screw extruder with an L/D ratio of 27 equipped with a linear 3 zone screw. The extruder settings were:

| Temperatures in ° C. | | |
|---|---|---|
| hopper zone | 25 | |
| Temperature zone 1 | 315 | |
| Temperature zone 2 | 365 | |
| Temperature zone 3 | 370 | |
| Temperature zone 4 | 380 | |
| Adapter | 380 | |
| Crosshead | 395 | |
| Die | 395 | |
| Tip | 400 | |
| Screwspeed | 10 | rpm |
| Pressure of melt | 118 | Bar |
| Linespeed | 8 | m/min |
| Vacuum | 500 | mmWk |
| wire preheat | 195 | ° C. |
| air gap | 6 | cm |
| Water cooling | 50 | ° C. |
| die | 4.16 | mm |
| Tip | 2.04 | mm |
| wire size | 0.71 | mm |
| Foam outer diameter | 2.1 | mm |

The cable had a foam existing of closed cells with a particle size less than 100 μm (determined via light-microscope).

The foaming degree of the cable was 35% determined by weight measurement. The weight of a given cable-length with a specific diameter results in the density of the foamed insulation, this density compared to the density of the unfoamed, solid cable with the same dimensions represents the foaming degree.

Example 2

Composition B.

Composition B was prepared as described in example 1 and contained:

95% by weight of FEP with an MFI of 16 g/10 min (measured according ASTM D1238) and a melting point of 251° C., 5% by weight of Zeolite EY033 from Eka Chemicals, a Y Zeolite with a silica-alumina ratio of 55, moisture content of 1.2% by weight measured via thermal gravimetric analyses with a heating ramp of 10° C./min up to 460° C. measured in air.

Composition C.

Composition C contained 7.5% by weight of boronnitride (BN) and 92.5% of FEP (as mentioned in composition B). Composition C was prepared by meltblending.

Compositions B and C were mixed in a weight ratio of B:C=9:1 in order to reach a Zeolite concentration of 4.25% by weight and a BN concentration of 0.75% by weight.

This blend was extruded on a W&C extruder equipment as described in example 1. Settings were as followed:

| Temperatures in ° C. | | |
|---|---|---|
| Hopper zone | 31 | |
| Temperature zone 1 | 315 | |
| Temperature zone 2 | 360 | |
| Temperature zone 3 | 365 | |
| Temperature zone 4 | 380 | |
| Adapter | 380 | |
| Crosshead | 395 | |
| Die | 395 | |
| Tip | 400 | |
| Screwspeed | 19.4 | rpm |
| Pressure of melt | 54 | Bar |
| Linespeed | 13 | m/min |
| Vacuum | 1000 | mmWk |
| Wire preheat | 195 | ° C. |
| Air gap | 70 | cm |
| Water cooling | 25 | ° C. |
| Die | 4.16 | mm |
| Tip | 2.04 | mm |
| Wire size | 0.71 | mm |
| Foam outer diameter | 2.04 | mm |

The foaming degree of the cable is app 44% determined by weight measurement. A coaxial cable of the foamed sample was constructed by applying a second conductor on top of the insulation, i.e. by braiding, and assembling connectors at the ends. The electrical properties of this coaxial cable were then measured. The electrical performance (through measuring the velocity of propagation) of the cable showed a dielectric constant of 1.54 between 200 MHz and 1.4 GHz and a loss factor tan □ of less than $5*10^4$ was observed. The cable had a foam existing of open and closed cells where the closed cells had a particle size <75 μm and the open cells had an average size of 10 μm. (measured via REM microscope, samples cut in liquefied nitrogen) see FIG. 1.

Example 3

Composition D.

Composition D was prepared in the same way as composition B in example 2 except that instead of EY033, Zeolite Flavith D 206 from Degussa was used.

A mixture was made of composition D and composition C (described in example 2) by blending the compositions in a weight ratio of D:C=9:1 in order to reach a Zeolite concentration of 4.25% by weight and a BN concentration of 0.75% by weight.

This blend was extruded on a W&C extruder equipment as described in example 1 with following extruder-settings:

| Temperatures in ° C. | | |
|---|---|---|
| Hopper zone | 25 | |
| Temperature zone 1 | 315 | |
| Temperature zone 2 | 365 | |
| Temperature zone 3 | 370 | |
| Temperature zone 4 | 380 | |
| Adapter | 380 | |
| Crosshead | 395 | |
| Die | 395 | |
| Tip | 400 | |
| Mass temperature | 362 | |
| Screwspeed | 17.9 | rpm |
| Meltpressure | 161 | Bar |
| Linespeed | 10 | m/min |
| Vacuum | 1000 | mmWk |
| Wire preheat | 195 | ° C. |
| Air gap | 68 | Cm |
| Water cooling | 25 | ° C. |
| Die | 4.16 | mm |
| Tip | 2.04 | mm |
| Wire size | 0.71 | mm |
| Foam outer diameter | 2.05 | mm |

The electrical performance (through measuring the velocity of propagation) of a coaxial cable prepared from this cable according to the procedure described in example 2, showed a dielectric constant of 1.59 and a loss factor tan δ of $8.7*10^-5$ both measured at 100 kHz. The unfoamed FEP has a dielectric constant of 2.06 and a loss factor tan δ of 2.5*10$^{-4}$ at 100 kHz. It can thus be calculated that the foaming degree of the sample is 44%.

The cable had a foam existing of open and closed cells where the closed cells had an average particle size 43 μm and the open cells had an average size of 15μm. (measured via REM microscope, samples cut in liquefied nitrogen)

Example 4

Of composition D from example 3 and composition C from example 2 a mixture was made by blending the compositions in a weight ratio D:C=9:1 in order to reach a Zeolite concentration of 4.25% by weight and a BN concentration of 0.75% by weight. This mixture was extruded on a cast-film extrusion line existing of a 30 mm IDE extruder with an L/D of 27 linear screw, a slot die from Breyer type: FPD with an effective broadness of 320 mm and a chill-roll - web take up unit from Dr Collin. Following conditions were used:

| Temperatures in ° C. | | |
| --- | --- | --- |
| Temperature zone 1 | 290 | |
| Temperature zone 2 | 315 | |
| Temperature zone 3 | 330 | |
| Temperature zone 4 | 330 | |
| Adapter 1 | 345 | |
| Adapter 2 | 345 | |
| Die zone 1 to zone 8 | 380 | |
| Chill roll 1 | 220 | |
| Chill roll 2 | 165 | |
| Temperature of melt | 347 | |
| Screwspeed | 20 | Rpm |
| Pressure of melt | 24 | Bar |
| Linespeed | 1.18 | m/min |
| Film thickness | 190 | μm |
| Effective film width | 185 | Mm |
| Air gap | 50 | Mm |

The film had a foaming degree of 21% determined via density measurement.

What is claimed is:

1. Foamed article comprising a foamed fluoropolymer comprising a zeolite in amount of at least 0.3% by weight based on the weight of the foamed polymer.

2. Foamed article according to claim 1 wherein said foamed article is selected from a film, a cable having said foamed layer thereon, a tube and a piezoelectric substrate.

3. Foamed article according to claim 1 wherein said zeolite is present in an amount of at least 0.5% by weight based on the weight of polymer.

4. Foamed article according to claim 1 wherein said zeolite has an average particle size of not more than 15 μm.

5. Foamed article according to claim 1 wherein said zeolite has a water content of less than 10% by weight.

6. Foamed article according to claim 1 wherein said foamed layer of polymer comprises foam cells having an average size of not more than 100 μm.

7. Foamed article according to claim 1 wherein said fluoropolymer is a melt processable fluoropolymer.

8. Foamed article according to claim 7 wherein said melt processable fluoropolymer is a fluoropolymer comprising one or more units derived from fluorinated monomers selected from the group consisting of tetrafluoroethylene, vinylidene fluoride, vinyl fluoride, chlorotrifluoroethylene, fluorinated alkyl olefins, fluorinated vinyl ethers and fluorinated allyl ethers and optionally one or more units derived from non-fluorinated olefins.

9. Foamed article according to claim 1 wherein said zeolite is selected from the group consisting of zeolite Y, zeolite X, zeolite A, zeolite ZSM-5 and zeolite beta.

10. Method of foaming a fluoropolymer comprising the steps of providing a composition comprising said fluoropolymer and a zeolite in an amount of 0.3% or more based on the weight of said fluoropolymer and thermally processing said composition to form a foamed fluoropolymer.

11. Method according to claim 10 wherein said zeolite is present in an amount of at least 0.5% by weight based on the weight of polymer.

12. Method according to claim 10 wherein said zeolite has an average particle size of not more than 15 μm.

13. Method according to claim 10 wherein said zeolite has a water content of not more than 10% by weight.

14. Method according to claim 10 wherein said fluoropolymer is a melt processable fluoropolymer.

15. Method according to claim 14 wherein said fluoropolymer is a fluoropolymer comprising one or more units derived from fluorinated monomers selected from the group consisting of tetrafluoroethylene, vinylidene fluoride, vinyl fluoride, chlorotrifluoroethylene, fluorinated alkyl olefins, fluorinated vinyl ethers and fluorinated allyl ethers and optionally one or more units derived from non-fluorinated olefins.

16. Method according to claim 10 wherein said zeolite is selected from the group consisting of zeolite Y, zeolite X, zeolite A, zeolite ZSM-5 and zeolite beta.

17. Method according to claim 10 wherein said composition is foamed in the absence of a physical foaming agent.

18. Method according to claim 10 wherein there is further added to said composition a physical foaming agent.

19. Method of utilizing a zeolite as a foaming agent to cause the foaming of a polymer.

20. Method according to claim 19 wherein said polymer is a fluoropolymer.

* * * * *

UNITED STATES PATENT AND TRADEMARK OFFICE
CERTIFICATE OF CORRECTION

PATENT NO.    : 6,538,050 B1
DATED         : March 25, 2003
INVENTOR(S)   : Weilandt, Karl-Dieter It is certified that error appears in the above-identified patent and that said Letters Patent is hereby corrected as shown below:

<u>Column 8,</u>
Line 21, delete "$10^4$" and insert in place thereof -- $10^{-4}$ --.

Signed and Sealed this

Fifteenth Day of July, 2003

JAMES E. ROGAN
*Director of the United States Patent and Trademark Office*